United States Patent [19]
Eddleman et al.

[11] 3,838,978
[45] Oct. 1, 1974

[54] VACUUM FILTER WITH REMOVABLE FILTER ELEMENT

[75] Inventors: Roy T. Eddleman, Beverly Hills; Richard L. Schmitz, Palos Verdes Peninsula, both of Calif.

[73] Assignee: BioSpectrum Incorporated, Los Angeles, Calif.

[22] Filed: Aug. 17, 1972

[21] Appl. No.: 281,417

[52] U.S. Cl. ................... 23/292, 210/406, 210/447, 210/450
[51] Int. Cl. .............................................. B01l 3/00
[58] Field of Search ...... 23/292, 259; 210/406, 447, 210/450; 215/48; 277/168

[56] References Cited
UNITED STATES PATENTS
3,319,792   4/1967   Leder et al. ..................... 210/323
3,437,211   4/1969   Lindsey ............................ 210/406

OTHER PUBLICATIONS
Schaar and Company, Selected Laboratory Equipment, Catalog No. 50, 1950, Schaar and Co. 754 W. Lexington St., Chicago, Ill, P. 294.

*Primary Examiner*—Joseph Scovronek
*Assistant Examiner*—Dale Lovercheck

[57] ABSTRACT

Apparatus for performing laboratory vacuum filtration having a removable filter element is disclosed. The removable element comprises a porous disc having a groove formed in its periphery. The apparatus includes a funnel which has a cylindrically shaped upper wall and the porous disc is held within the wall of the funnel by an O-ring. The O-ring may further be used to hold a filter medium such as filter paper onto the porous disc. The filter apparatus further utilizes an elastomeric stopper which fits into the neck of a bottle or other filtrate container.

6 Claims, 8 Drawing Figures

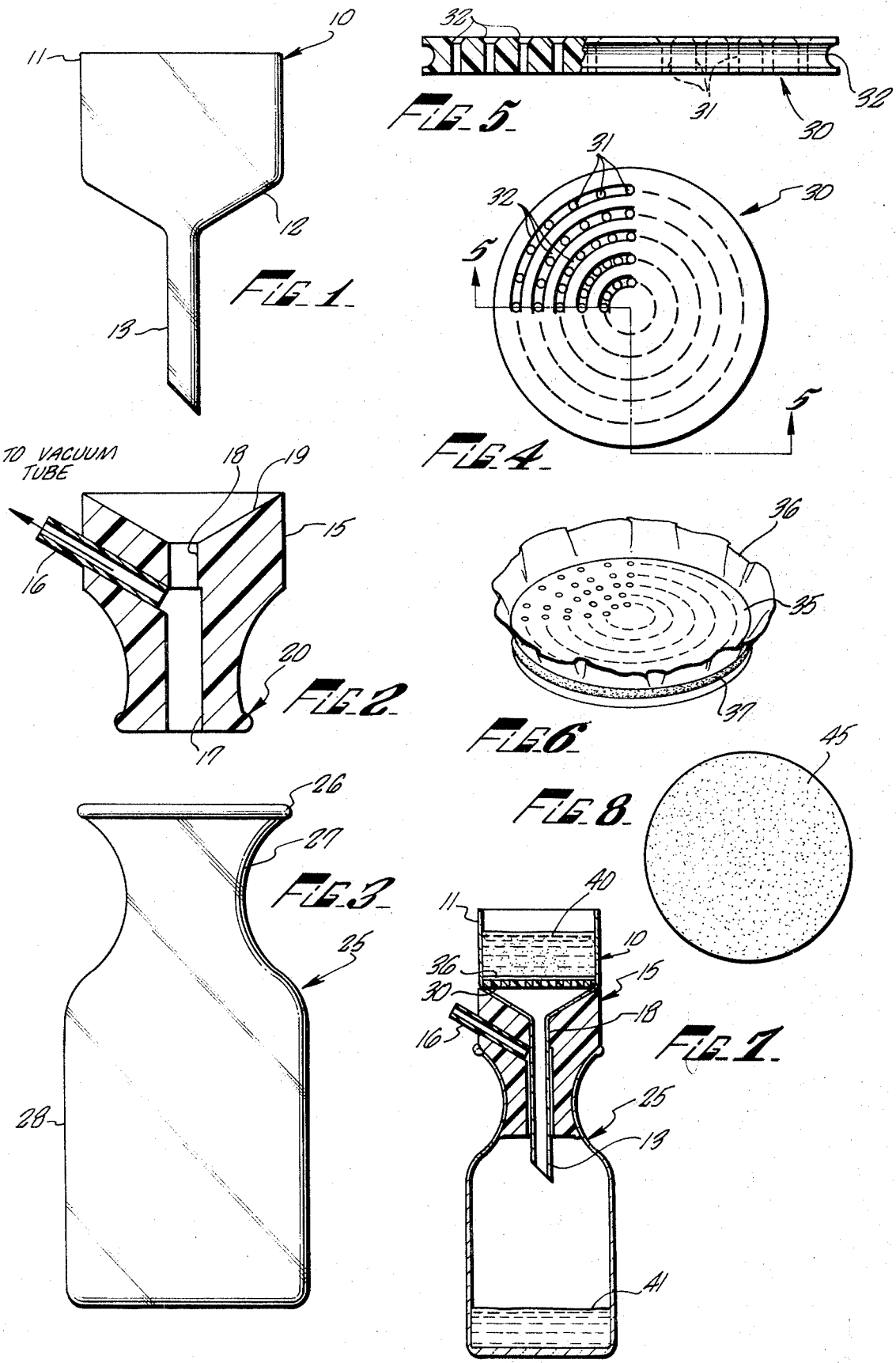

3,838,978

VACUUM FILTER WITH REMOVABLE FILTER ELEMENT

BACKGROUND OF THE INVENTION

Various apparatus for performing vacuum filtration are known with a commonly used assembly comprising a vacuum flask having an outlet for connection to a vacuum source and an upper opening which holds a stopper and funnel. The stopper, which has an axially aligned central opening, is inserted in the upper opening of the flask and a filter funnel is inserted within this stopper opening. Such vacuum funnels typically have an integrally formed porous disc which is capable of performing a filtering function either by itself or in conjunction with a piece of filter paper which can be placed on its upper surface. Such filter paper has the same diameter as the inside diameter of the funnel at that point at which the porous element meets the funnel.

While the above-described assembly is satisfactory in operation, the funnel having an integrally formed porous element is both expensive to fabricate and difficult to clean. Furthermore, the vacuum flask is relatively expensive and thus there is a need for a vacuum filter assembly which need not utilize these two relatively expensive elements and which also may be more readily cleaned.

SUMMARY OF THE INVENTION

It is thus an object of the present invention to provide an easily cleaned vacuum filter assembly.

It is another object of the present invention to provide an economical vacuum filter.

It is yet another object of the present invention to provide an economical vacuum filter and flask assembly.

The present invention is for a vacuum filter element comprising a porous disc having a groove formed in its outer periphery. This disc is adapted to fit within a funnel which has a cylindrically shaped upper wall and an O-ring is placed within the peripheral groove of the disc and the disc, funnel and O-ring are sized so that when assembled, the O-ring contacts both the inside of the funnel and the peripheral groove of the disc. An elastomeric stopper permits the vacuum filter to be used in conjunction with a standard glass bottle or other container. The stopper has a passageway both for the funnel and for a vacuum source. The glass bottle or other filtrate container may be of any size or configuration as long as it is capable of withstanding the intended vacuum. The porous disc may further be used in conjunction with a filter medium such as filter paper in which configuration the O-ring can serve to hold the filter medium over the upper surface of the porous disc. The porous disc may be fritted glass, a solid, inert medium having passageways or holes formed therethrough or any porous, inert medium which has sufficient physical strength to withstand the intended vacuum. The funnel may be fabricated from glass, plastic, ceramic or any material having the requisite strength and chemical resistance.

BRIEF DESCRIPTION OF THE DRAWINGS

FIG. 1 is a side elevation of the glass funnel useful with the present invention.

FIG. 2 is a cross-sectional side elevation of a rubber stopper useful with the present invention.

FIG. 3 is a side elevation of a glass bottle useful with the present invention.

FIG. 4 is a plan view of a porous disc of the present invention.

FIG. 5 is a side elevation taken along line 5—5 of FIG. 4.

FIG. 6 is a perspective view of the bottom of the disc of FIGS. 4 and 5 having a filter medium held thereto by an elastic O-ring.

FIG. 7 is a side elevation, partly in cross section, of an assembled vacuum filter assembly of the present invention.

FIG. 8 is a plan view of an optional porous disc.

DESCRIPTION OF THE PREFERRED EMBODIMENTS

A glass funnel 10 is shown in FIG. 1 and has a cylindrically shaped upper wall 11, a frustro-conical intermediate section 12 and a hollow cylindrical stem 13. A rubber stopper 15 is shown in cross section in FIG. 2 and has a glass tube 16 inserted therein which forms a means for connecting a vacuum hose to the vacuum filter assembly. Glass tube 16 communicates with an inner passage 17 which provides a passageway between the vacuum source and the interior of the glass bottle into which stopper 15 is inserted. A hole 18 is formed coaxially with passage 17 and has an inside diameter smaller than the outside diameter of stem 13 so that an airtight seal is formed between stem 13 and hole 18. A frustro-conical seat 19 is formed in the upper portion of stopper 15 and has the same shape as section 12 of funnel 10. The lower portion of stopper 15 has a lower protrusion 20 which serves to help hold the stopper within the glass bottle which is described below.

A glass bottle 25 is shown in FIG. 3 and is of a type recently introduced and now in common use in laboratories. Glass bottles of the type are disclosed in application serial number 138,617 and now U.S. Pat. No. 3,779,415, issued Dec. 18, 1973, filed Apr. 29, 1971 by Roy T. Eddleman, the present applicant and is assigned to the assignee of the present invention. That application is incorporated by reference herein. Bottle 25 has an upper lip 26, a neck 27 and a lower cylindrical portion 28.

The porous disc of the present invention is shown in FIGS. 4 and 5 and indicated by reference character 30. Disc 30, shown most clearly in FIG. 5, is made porous by the addition of a plurality of holes 31 which pass through disc 30 and form passageways from its upper surface to its lower surface. A peripheral groove 32 is formed in the side of disc 30 which serves as a seat for a rubber O-ring. Disc 30 can also contain a plurality of grooves 32 in its upper surface which, as shown in FIG. 5, may have a semicircular cross-sectional shape. Both sides of disc 30 may have such grooves so that it can be used with either surface facing upwardly. The assembly of the porous disc, a piece of filter paper, and an elastomeric O-ring is shown in FIG. 6. The disc, funnel and O-ring should fit together so that they form a leak-proof seal between the O-ring and the funnel and the O-ring and the disc. That is, the diameter of the O-ring should be sufficient to fill the space between the disc and the inside funnel wall (i.e., the cross-sectional diameter of the O-ring should be at least one half of the difference between the inside diameter of the funnel and the outside diameter of the center of the peripheral groove in the disc). The underside of disc 30 is indicated by reference character 35 and filter paper 36 is held over the upper surface of disc 30 by rubber O-ring 37. In use, it is generally beneficial to cut or otherwise remove any substantial excess filter paper which protrudes below disc 30. The device of the present invention need not utilize a rubber O-ring and other resilient sealing means may be used as long as it prevents any substantial leakage of liquid between the funnel wall and the porous disc. Furthermore, the sealant means need not be positioned in a central groove but instead could be located in an L-shaped circumferential groove, held in a separate holding member or otherwise securely positioned.

The assembled unit is shown in FIG. 7 after the porous disc, filter paper and O-ring have been inserted within funnel 10. A liquid 40 to be filtered is shown above the filter paper 36 which is held over disc 30. An airtight seal is formed between stem 13 and hole 18 of stopper 15. A source of vacuum is, of course, connected to tube 16 which reduces the pressure inside of bottle 25 thus reducing the pressure on the underside of filter paper 36. The filtrate 41 is collected in the bottom of bottle 25.

An alternative type of porous disc is shown in FIG. 8 where porous disc 45 is fabricated from fritted or sintered glass. Various other porous mediums can be used to fabricate disc 30 keeping in mind the requirement of requisite physical strength and chemical resistance to the mediums to be filtered. Furthermore, it is often desirable that the porous disc be capable of being heated to sterilize it. Whereas the assembly of FIG. 7 shows the porous disc with an installed filter paper, it is not necessary that filter paper be used. When a porous disc such as that shown in FIG. 8 is used, the disc itself can serve as a filter medium and no additional filtering medium is required. Various filter aids may, of course, be used in conjunction with the device of the present invention. Furthermore, the filter paper need not be held onto the porous disc by the O-ring but may instead be used in a manner similar to that used in prior art vacuum filters. That is, the filter paper has an outside diameter equal to the inside diameter of the funnel and is merely placed on the upper surface of the porous disc and O-ring combination.

A particularly easy method for installing a filter medium such as filter paper 36 over disc 30 has also been discovered. First, the filter paper is placed over the upper surface of disc 30. Secondly, funnel 10 is placed over disc 30 and filter paper 36 thereby bending filter paper 36 over groove 32 in disc 30. Next, the elastomeric O-ring 37 is placed over the stem and cylindrical portion of funnel 10. It is worked down to the wide opening in funnel 10 at which point the funnel is removed and O-ring 37 slips onto filter paper 36 and distorts the paper into the groove 32 along the periphery of the disc.

Particularly useful porous disc members include the above-mentioned fritted glass and plastic disc formed from polytetrafluoroethylene which have a plurality of holes formed therethrough. Other polymers may be used in place of polytetrafluoroethylene but the physical strength and chemical inertness of this polymer makes it particularly useful.

The filter assembly of the present invention has numerous advantages over vacuum filters heretofore known. For instance, the funnel can be readily and completely cleaned since the porous disc may be easily removed therefrom. Thus, anything trapped between the stem and the porous disc may be far more easily removed than with funnels in which the disc is not removable. Furthermore, it is not necessary that an expensive piece of glassware such as a vacuum flask be used since the bottle which collects the filtrate need not have a vacuum port formed in the side. While any bottle having a properly sized opening may be used in conjunction with the present invention, it is important that a bottle be capable of withstanding the vacuum which is formed by the vacuum source. In order to prevent bottle breakage, it is possible that a safety valve or other controller be connected to the vacuum source so that any particular preset value or amount of vacuum is not exceeded. It is, of course, possible that the funnel and removable disc be utilized with a conventional vacuum flask and stopper. The new funnel and disc still have the cost and cleaning advantages inherent with their use as shown in the assembly of FIG. 7.

The elastomeric stopper may be fabricated from any conventional elastomer, preferably one which has chemical resistance to the liquids to be filtered. Examples of commonly used elastomers include natural rubber or synthetic polymers such as silicone elastomers, polyisoprene, polyurethane elastomers and the like. Similarly, the O-ring may be fabricated from any elastomer which has the requisite elasticity and chemical inertness. It is, of course, more important that the O-ring be resistant to the liquid to be filtered than the stopper since the O-ring will be immersed in the liquid and the stopper, if carefully used, need not contact the liquid.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:
1. A vacuum filter funnel assembly comprising:
    a funnel having a cylindrically shaped upper wall;
    a porous disc within said funnel, said disc having an outside diameter slightly smaller than the inside diameter of said cylindrically shaped upper wall and having a groove formed in its peripheral wall;
    sealing means located about the periphery of said disc, said sealing means having a cross-sectional diameter at least as large as 1/2 of the difference between the inside diameter of said wall and the outside diameter of the center of the groove in said disc; and
    thin flexible filter means located over the upper surface of said disc and extending over the outer periphery of said disc and held over said disc by said sealing means.
2. The assembly of claim 1 wherein said disc is fabricated from porous glass.
3. The assembly of claim 1 wherein said sealing means comprises an elastomeric O-ring.
4. The assembly of claim 1 wherein said disc is fabricated from an inert medium having passageways located therein, said passageways passing from one face of said disc to the other face.
5. The assembly of claim 4 wherein said inert medium is polytetrafluoroethylene.
6. The assembly of claim 1 wherein said thin flexible filter means is filter paper.

* * * * *